UNITED STATES PATENT OFFICE.

HERBERT WILLIAM GEPP AND DAVID AVERY, OF MELBOURNE, VICTORIA, AND ROYALE H. STEVENS, WILLARD C. SNOW, AND WENDELL M. WHITECOTTON, OF RISDON, HOBART, TASMANIA, AUSTRALIA, ASSIGNORS TO ELECTROLYTIC ZINC COMPANY OF AUSTRALASIA PROPRIETARY LIMITED, OF MELBOURNE, VICTORIA, AUSTRALIA.

TREATMENT OF ZINC-BEARING ORES FOR THE RECOVERY OF ZINC BY ELECTRODEPOSITION.

1,322,104.     Specification of Letters Patent.     Patented Nov. 18, 1919.

No Drawing.     Application filed May 6, 1919. Serial No. 295,246.

*To all whom it may concern:*

Be it known that we, HERBERT WILLIAM GEPP, of Collins House, 360–366 Collins street, Melbourne, in the State of Victoria, Commonwealth of Australia, DAVID AVERY, of Collins House, 360–366 Collins street, Melbourne aforesaid, subjects of the King of Great Britain, ROYALE HILLMAN STEVENS, WILLARD CONRAD SNOW, and WENDELL MAURICE WHITECOTTON, care of Electrolytic Zinc Company of Australasia Proprietary Limited, Risdon, Hobart, in the State of Tasmania, Commonwealth of Australia, citizens of the United States of America, residing at the above addresses, have invented certain new and useful Improvements in the Treatment of Zinc-Bearing Ores for the Recovery of Zinc by Electrodeposition, of which the following is a specification.

This invention relates to certain improvements in the treatment of zinc bearing ores for the recovery of zinc by electrodeposition and refers more especially to that method of treatment in which the ores are leached with an electrolyte containing sulfuric acid obtained from the electrolysis of zinc sulfate solutions the liquors being maintained in continuous circulation.

In the recovery of zinc by electrodeposition it has been found that the presence of certain impurities interferes with and detrimentally affects the deposition of the zinc and experience has shown that when such impurities have accumulated to a certain extent by the continuous circulation of the solutions it is essential that they must be removed for effective working.

The usual methods of purification of zinc solutions preparatory to electrolysis comprise treatment with limestone for precipitation of iron and other impurities and with finely divided zinc in the form of zinc dust or blue powder for the precipitation of any silver, arsenic, antimony, copper or cadmium or similar metals present. These methods of treatment however have not been found effective for the removal of cobalt which is found to be a substance which most adversely affects the subsequent electrodeposition of the zinc.

It has been discovered that if during the electrolysis of zinc sulfate solutions there is present a certain small proportion of glue the deleterious effect of such impurities upon the electrodeposition of the zinc is materially minimized and operations can be continued with effective results, under conditions which would not otherwise be possible. In this method of treatment however owing to the cobalt not having been removed by the methods of purification adopted the cobalt accumulates with the continuous circulation of the solutions and the quantity of glue present must be increased.

If the purification treatment with zinc dust is carried out in the presence of arsenic and copper the cobalt will be effectively thrown down with the arsenic. In carrying out this method of purification therefore it is necessary to have in the zinc sulfate solution a sufficient quantity of soluble arsenic and copper as well as the zinc dust which is added for the removal of the cobalt and other impurities. This method of purification with arsenic is preferably carried out in hot solutions. Also if the zinc sulfate solutions be subjected to treatment with lead peroxid and a compound of manganese (such as manganese sulfate) the cobalt can be effectively removed.

This invention comprises treatment in intermittent cycles, that is to say, by first proceeding with the deposition in the ordinary way with additions of glue in sufficient quantities to maintain effective working, and then changing over to a method of treatment in which special means are adopted for the removal of deleterious substances and then renewing again the first mentioned cycle.

According to this invention the zinc bearing solutions are subjected to treatment which comprises purification by the ordinary means, that is to say first with limerock and then with zinc dust or blue powder and then carrying out the electrodeposition of the zinc in the presence of such quantity of glue as is required to maintain the cycle until the cobalt and other impurities have accumulated to such an extent as to make their removal desirable when for example they require the addition of undue quantities of glue.

In the cycles in which glue is used the solution must be substantially free from the metals of the second group (silver, arsenic, copper, cadmium, etc.,) and these are removed by the precipitation with zinc dust or blue powder. The glue inhibits the deleterious effects of certain impurities, such as cobalt and nickel, which are not removed in the ordinary way by zinc dust or blue powder. In practice we have found that with solutions containing up to 100 mgs. of cobalt per liter it is necessary to add 5 lbs. of glue per ton of zinc produced and as the cobalt increases we have found that it is desirable to add one additional pound of glue for each additional increase of 50 mgs. of cobalt per liter.

In practice we have found that it is not desirable to carry on when the cobalt has accumulated to the extent of from 200 to 300 mgs. per liter but this point is effected by other conditions such as the presence or otherwise of other impurities and the ordinary conditions of economical working. When the condition of the solutions has reached such a state it is not desirable to further pursue that treatment.

The continuous cycle of the solutions is broken and additional methods of purification are adopted for the removal of the cobalt and such other impurities as interfere with the successful deposition of the zinc. These additional methods of purification may be by means of arsenic treatment such as is described in the specification of application for patent in United States Ser. No. 246642 or by means of peroxid of lead treatment in the presence of a salt of manganese such as is described in the specification of application for patent in United States Ser. No. 246641.

When proceeding with the aforesaid arsenic treatment for the removal of cobalt we have found that additions to the solutions of soluble salts equivalent to 1.5 mgs. of copper and 1.5 mgs. of arsenic for each mg. of cobalt present and adding from 8 to 10 times the quantity of blue powder or zinc dust as copper added and carrying out the purification at a temperature of about 75° C. the cobalt and other impurities are effectively removed.

For example if the solutions contain 200 mgs. of cobalt per liter we add per liter 300 mgs. of copper (as copper sulfate) 300 mgs. of arsenic (as sodium arsenite) and 2.5 to 3 grams of blue powder or zinc dust. We prefer to add all the copper and the arsenic with the exception of 50 milligrams per liter each and add the blue powder or zinc dust in stages as follows:

60% of the metal blue powder or zinc dust at the start.
20 " " " " after a half-hour.
10 " " " " " 1 hour.
10 " " " " " 2 hours.

Just before the last addition of blue powder or zinc dust we add the final 50 milligrams per liter each of arsenic and of copper.

If the peroxid of lead and manganese treatment is employed for the removal of the cobalt we arrange to have in the solution 10 milligrams of manganese per milligram of cobalt present and 6 parts of freshly prepared peroxid of lead for every part of manganese present. This purification operation for the removal of cobalt is preferably carried out at a temperature of 40 to 50° C. The cycle of the solutions with the additions of glue is then renewed and maintained until the cobalt has accumulated to a certain extent then purification for the removal of the said cobalt is again effected in the manner described.

We claim—

1. In the treatment of zinc bearing material for the recovery of zinc by electro-deposition in which the material is treated in a cyclic manner with the spent solution of the electro-depositing step to remove the zinc, the step of eliminating the easily removed impurities prior to the electro-depositing step and of overcoming the prejudicial effect of other impurities by additions of glue in sufficient quantities to maintain effective working conditions in the electro-deposition of the zinc, together with the step of periodically treating the cyclic solution to maintain said other impurities below the percentage at which the effectiveness of further additions of glue becomes so impaired as to interfere with effective deposition of the zinc; substantially as described.

2. In the treatment of zinc bearing material for the recovery of zinc by electro-deposition in which the material is treated in a cyclic manner with the spent solution of the electro-depositing step to dissolve the zinc, the step of eliminating the easily removed impurities prior to the electro-depositing step and of overcoming the prejudicial effect of other impurities upon the electro-deposition of the zinc by the addition of an appropriate agent, together with the step of periodically treating the cyclic solution to maintain the accumulation of said other impurities in this solution below the percentage at which the effectiveness of further additions of said agent becomes so impaired as to interfere with effective deposition of the zinc; substantially as described.

3. In the treatment of zinc bearing material for the recovery of zinc by electro-deposition in which the material is treated in a cyclic manner with the spent solution of the electro-depositing step to dissolve the zinc, the step of eliminating the easily removed impurities prior to the electro-depositing step and of overcoming the prejudicial effect of other impurities upon the electro-deposition of zinc by the addition of an animal colloid to the solution, together with the step of periodically treating the cyclic solution to maintain the accumulation of said other impurities in the solution below the percentage at which the effectiveness of further additions of the animal colloid becomes so impaired as to interfere with the effective deposition of the zinc; substantially as described.

4. In the treatment of zinc bearing material for the recovery of zinc by electro-deposition in which the material is treated in a cyclic manner with the spent solution of the electro-depositing step to dissolve the zinc, the step of eliminating the easily removed impurities prior to the electro-depositing step, and of overcoming the prejudicial effect of other impurities upon the electro-deposition of the zinc by the addition of an appropriate agent, together with the step of periodically treating the cyclic solution with finely divided zinc in the presence of arsenic to maintain the accumulation of said other impurities in the solution below the percentage at which the effectiveness of further additions of said agent becomes so impaired as to interfere with effective deposition of the zinc; substantially as described.

5. In the treatment of zinc bearing material for the recovery of zinc by electro-deposition in which the material is treated in a cyclic manner with the spent solution of the electro-depositing step to dissolve the zinc, the step of eliminating the easily removed impurities prior to the electro-depositing step and of overcoming the prejudicial effect of other impurities upon the electro-deposition of the zinc by the addition of an appropriate agent, together with the step of periodically treating the cyclic solution with finely divided zinc in the presence of arsenic and copper to maintain the accumulation of said other impurities in the solution below the percentage at which the effectiveness of further additions of said agent becomes so impaired as to interfere with effective deposition of the zinc; substantially as described.

6. In the treatment of zinc bearing material for the recovery of zinc by electro-deposition in which the material is treated in a cyclic manner with the spent solution of the electro-depositing step to dissolve the zinc, the step of eliminating the easily removed impurities prior to the electro-depositing step and of overcoming the prejudicial effect of other impurities upon the electro-deposition of the zinc by the addition of an appropriate agent, together with the step of periodically treating the cyclic solution with finely divided zinc in the presence of arsenic and copper at a temperature of about 75° C., to maintain the accumulation of said other impurities in the solution below the percentage at which the effectiveness of further additions of said agent becomes so impaired as to interfere with effective deposition of the zinc; substantially as described.

7. In the treatment of zinc bearing material for the recovery of zinc by electro-deposition in which the material is treated in a cyclic manner with the spent solution of the electro-depositing step to dissolve the zinc, the step of eliminating the easily removed impurities prior to the electro-depositing step and of overcoming the prejudicial effect of other impurities upon the electro-deposition of the zinc by the addition of glue to the solution, together with the step of periodically treating the cyclic solution with zinc dust in the presence of arsenic and copper to maintain the accumulation of said other impurities in the solution below the percentage at which the addition of further amounts of glue are insufficient to overcome the prejudicial effects of said other impurities, said zinc dust being added in stages; substantially as described.

In testimony whereof we affix our signatures in the presence of two witnesses.

HERBERT WILLIAM GEPP.
DAVID AVERY.
R. H. STEVENS.
W. C. SNOW.
W. M. WHITECOTTON.

Witnesses to signatures of H. W. Gepp and D. Avery:
G. L. CULLEN,
P. N. BONNERY.

Witnesses to signatures of R. H. Stevens, W. C. Snow, and W. M. Whitecotton:
EDWARD H. BUTLER,
ALLAN McINTYRE.